Sept. 11, 1962 J. P. BAGBY ET AL 3,053,159
CAMERA DIAPHRAGM AND BLADE THEREFOR
Original Filed Sept. 11, 1958 2 Sheets-Sheet 1
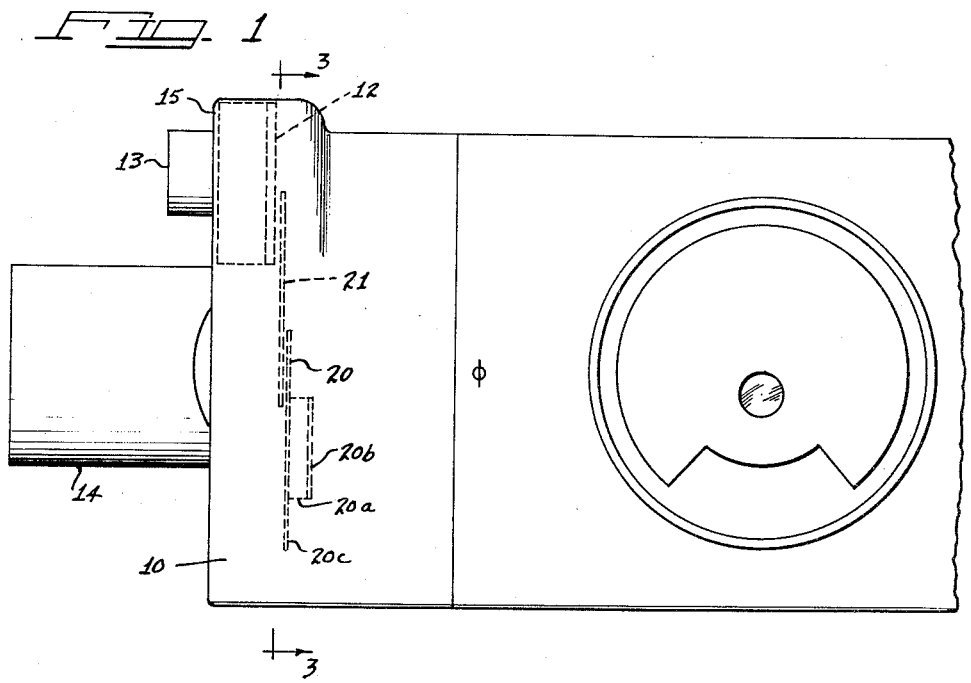
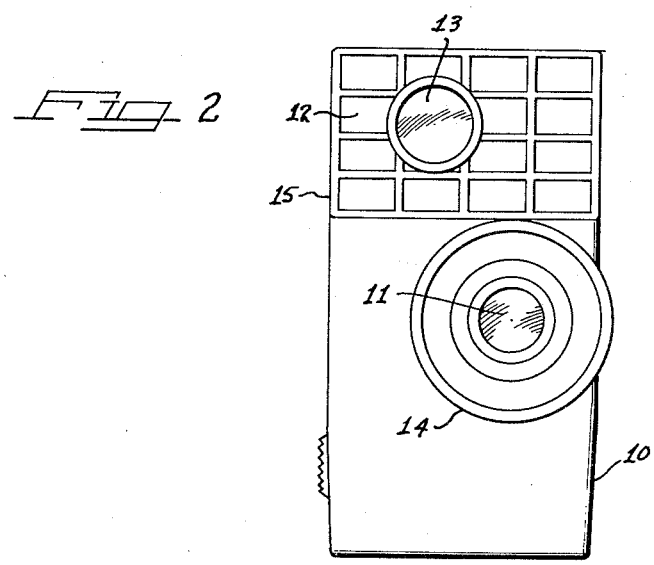
Inventors
John P. Bagby
Stanley R. Freeland

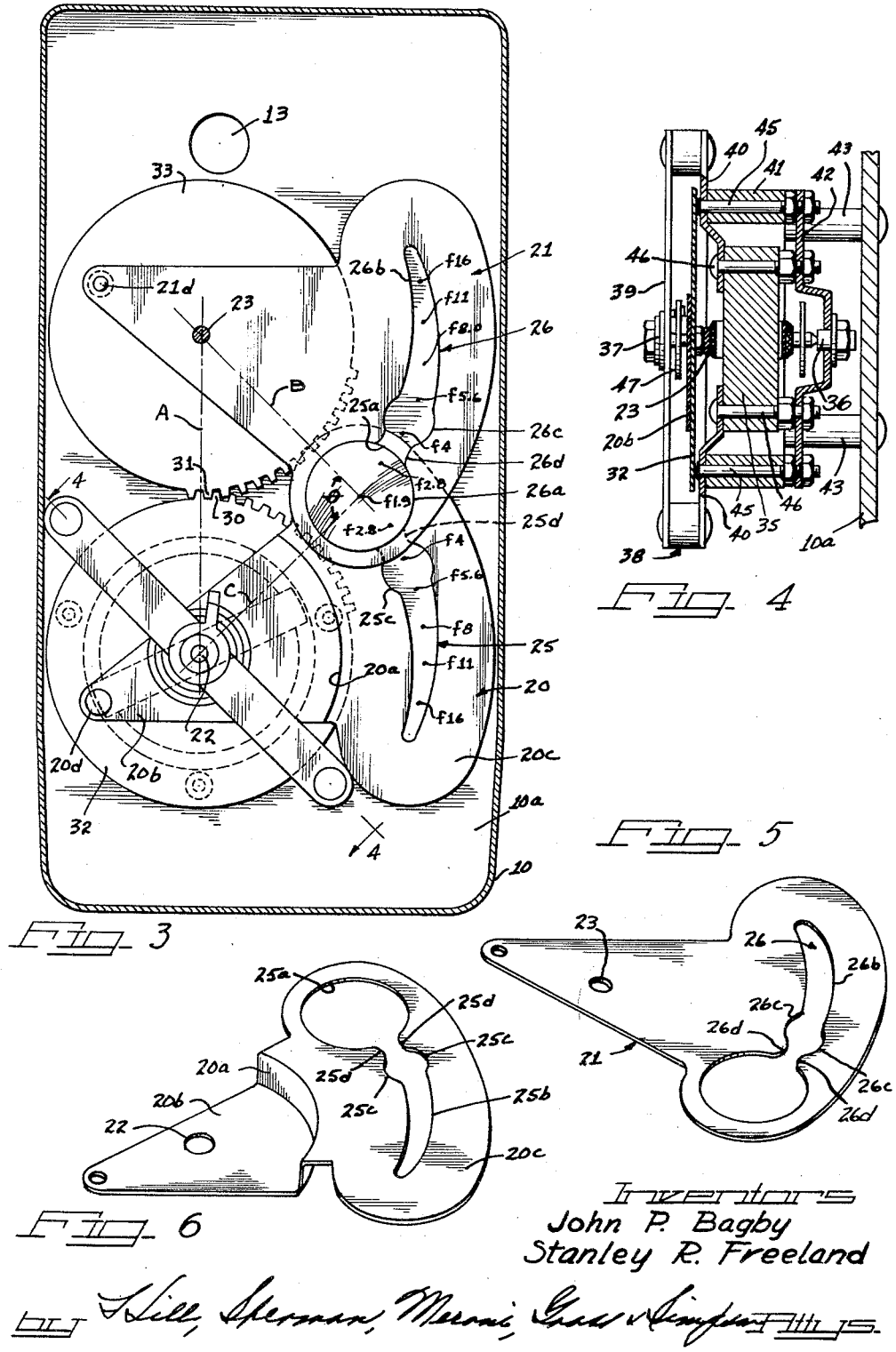

3,053,159
Patented Sept. 11, 1962

3,053,159
CAMERA DIAPHRAGM AND BLADE THEREFOR
John P. Bagby, Skokie, and Stanley R. Freeland, Evanston, Ill., assignors to Bell & Howell Company, Chicago, Ill., a corporation of Illinois
Original application Sept. 11, 1958, Ser. No. 760,459. Divided and this application Feb. 8, 1960, Ser. No. 7,428
5 Claims. (Cl. 95—64)

The present invention relates to photographic apparatus and, more particularly, is concerned with the provision of an improved diaphragm blade construction and opening configuration for said camera diaphragm. This application is a division of our copending application, Serial No. 760,459 filed September 11, 1958.

As is known to those skilled in the camera art, the provision of automatic control of camera diaphragm in response to variations in the amount of light reaching the camera during exposure of the film therein, is broadly known in the art. One very satisfactory form of apparatus accomplishing this general function is illustrated in United States Letters Patent No. 2,841,064, issued July 1, 1958. The specific structure illustrated in that patent, is particularly effective for utilization in an eight millimeter movie camera employing a relatively small lens. However, it employs an arrangement of diaphragm members having some space disadvantage when employed in larger cameras, such as for example sixteen millimeter movie cameras.

As was clearly established in the above-mentioned Patent No. 2,841,064, it is not only feasible but practical to provide an automatic exposure control for photographic cameras in which a galvanometer directly drives a plurality of overlapping diaphragm blades and is in turn directly powered from the electrical output of a light responsive photoelectric cell.

In accordance with the present invention, an overlapping diaphragm blade stucture is provided employing a first diaphragm blade directly mounted for rotation with the galvanometer meter coil. A second diaphragm blade is directly geared to the first rotating meter coil-diaphragm blade combination and is appropriately weighted to provide inertia balance between the two rotating masses. As a result of this arrangement the overlapping portions of the diaphragm blades are positioned at a point generally intermediate the axes of rotation of the rotary members and by positioning the spaced axes of the rotary members along a generally vertical line relative to the camera housing, and providing a relatively large overlapping portion, a relatively large aperture may be positioned generally centrally of the camera housing only slightly transversely spaced from the axes of rotation above mentioned, thereby providing an extremely compact inertia balanced camera of simple construction.

An important aspect of the present invention is an improved overlapping diaphragm aperture-defining tear drop shape. In accordance with the principles of the present invention an irregular tear drop shape is employed for greater accuracy throughout the range of diaphragm openings. One preferred embodiment of this improved form comprises a tear drop having a generally circular large diameter portion connected to a substantially narrower wedge-shaped portion with an irregularity at the point of junction. It has been found that a smooth curve tear drop configuration may be employed through the utilization of the irregularity above mentioned and that when thus employed, an extremely accurate diaphragm is provided.

It is, accordingly, an object of the present invention to provide an improved diaphragm blade aperture configuration for cameras.

Still other and further objects and features of the present invention will at once become apparent to those skilled in the art from a consideration of the herewith attached drawings wherein a preferred form of the invention is shown by way of illustration only, and wherein:

FIGURE 1 is a side-elevational view of a camera constructed in accordance with the principles of the present invention and illustrating certain components thereof in dotted lines;

FIGURE 2 is an end-elevational view of the camera illustrated in FIGURE 1;

FIGURE 3 is a cross-sectional view taken along the lines 3—3 of FIGURE 1 and illustrating, in end-elevation, the meter and diaphragm blade elements of the automatic exposure control;

FIGURE 4 is a cross-sectional view taken along the lines 4—4 of FIGURE 3 and illustrating the construction of the meter coil and diaphragm blade carried thereby;

FIGURE 5 is an isometric view of one of the diaphragm blades of the camera of the present invention; and FIGURE 6 is an isometric view of the second diaphragm blade of the present invention.

As shown on the drawings:

As may be seen from a consideration of FIGURES 1 and 2, the exposure control of the present invention is preferably employed in a compact moving picture camera employing a relatively large lens, such as, for example, a lens adapted for use with sixteen millimeter film the entire width of which is to be exposed. It is preferred that the camera assume a smooth, streamline, outward configuration, that a photoelectric cell be provided for controlling an automatic exposure apparatus and that automatic exposure apparatus be positioned within the confines of the camera case. This is efficiently accomplished in the camera arrangement illustrated, where the camera housing is indicated at 10, a lens is indicated at 11, a forwardly facing photoelectric cell is provided at 12, and a viewfinder window is provided at 13, all within a minimum housing or envelope. In the overall arrangement shown in FIGURES 1 and 2, the lens 11 is shrouded by a light shield 14. The shield 14 prevents undesired stray light from striking the lens, in the usual manner and a somewhat similar compartmentized shield 15 is provided in front of the photoelectric cell 12 to assure that the light reaching the surface of the photoelectric cell accurately reflects the light reflected from the scene to be photographed.

In spite of the compact arrangement of forwardly facing camera parts shown in FIGURES 1 and 2, a completely automatic exposure control is provided in the present camera. This is accomplished through utilization of a novel two-blade diaphragm which may clearly be understood from a consideration of FIGURES 3–8. As seen in FIGURE 3 a pair of overlapping diaphragm blades 20 and 21 are mounted for rotational movement about respective axes 22 and 23. The blade 20 is directly carried by the rotatable coil and armature assembly 23 of a galvanometer and, as will be more fully discussed below, is provided with an axial step 20a separating two generally parallel sections 20b and 20c. The planar portion 20c is positioned immediately adjacent to diaphragm blade 21 in overlapping relation thereto and cooperates therewith to provide an exposure aperture.

The exposure aperture is formed, more specifically, by a pair of generally tear drop shaped openings 25 and 26 in the respective blades 20 and 21. In the position of maximum aperture, in which the greatest amount of light is passed by the diaphragm blades, the blades are positioned as shown in FIGURE 3. As the blade 20 rotates in the counterclockwise direction, and the blade 21 rotates in the clockwise direction, the blades move to a position of minimal light transmission where the lens 11 is substantially covered by the blades.

In the arrangement shown, the blades 20 and 21 are directly geared together for rotation in opposite directions in simultaneous and positively timed relation. This gearing interconnection is formed by gear segments 30 and 31 formed on rotating elements 32 and 33 respectively. The gear member 32 is, with the blade 20, carried for rotation with the galvanometer armature 23 as clearly illustrated in FIGURE 4. As there shown, the galvanometer armature coil 23 is oscillatably carried relative to a core magnet 35, in bearings 36 and 37 which are fixedly secured to a cage structure generally indicated at 38. This structure comprises a top strap 39 directly carrying the socket bearing 37, an intermediate strap 40, a cylindrical ring 41, a bottom strap 42 and support posts 43. As may be seen from FIGURE 4, the ring 41 is rigidly secured to the mounting plate 10a of the camera casing 10 by means of the support posts 43 and the ring in turn rigidly carries the strap 39, 40 and 42 by means of the securing bolts 45. The armature core 35 is rigidly secured to the intermediate strap 40 and the bottom strap 42 by means of securing bolts 46. It will be at once apparent from a consideration of the arc of swing of the blades 20 and 21, that the blade 21 would, if in the same general plane as the meter coil 23, strike the meter coil 23 and associated parts when approaching the extreme position. In accordance with the present invention the parts are arranged to avoid this problem by positioning the blade 21 in a plane above the plane of the top strap 39. The positioning permits complete freedom of the blade 21 from the apparatus of the galvanometer. At the same time, this forward or upward positioning of the blade 21 requires that the blade 20 be stepped, as above noted at 20a, to position the aperture carrying portion 20c of the blade immediately adjacent the plane of blade 21. As a result of this arrangement the bearings 36 and 37 may be axially spaced a substantial distance apart, thereby improving the stability of the armature coil 23 and at the same time a minimum axial space for the blades is necessary. Further, as a practical matter, the axially spaced relationship between the aperture carrying portions of blades 20 and 21 is employed to advantage in construction of the gears 32 and 33. The gear 33 is generally cup-shaped and is substantially heavier than gear 32. At the same time, gear 32 is an extremely thin sheet of light weight material to minimize its weight.

In the arrangement illustrated, the relatively large aperture-defining portions of the blades 21 and 22 are balanced by respective counterweights 20d and 21d. The counterweight 20d projects upwardly to avoid conflict with any of the remaining parts and the counterweight 21d projects downwardly for similar reasons. If it is desired that the gear 33 extend upwardly a somewhat greater extent, the counterweight 21d may, of course, be placed on the gear 33 and in such event would, of course, be preferably positioned on the lower, or right hand side of the gear 33.

As may be seen from a consideration of FIGURE 3, the arrangement providing a pair of overlapping blades, one of which is directly carried by the meter, permits central placement of the camera lens 11. Further, the lens 11 may, as shown, be placed very close to the meter itself while still providing a substantially rectangular opening. The rectangular shape is provided by placing the axis of lens 11 as shown, with the triangle formed by center lines A, B and C such that angle θ approximates 90°. With this relationship, the generally arcuate tear drop apertures cross each other generally at right angles.

In considering the specific configuration of the apertures in the individual diaphragm members 20 and 21, it will be noted that the apertures 25 and 26 comprise an irregular tear drop shape. Thus, each aperture comprises a large generally round end portion, 25a, 26a, an extending wedge-shaped narrow portion, 25b, 26b, and an intermediate bulge or enlargement, 25c, 26c. This configuration is important and has proved to provide an extremely accurate transition from wide-open diaphragm aperture to diaphragm aperture of maximum constriction. As is well known in the photographic art the amount of lens opening is ordinarily designated by the f stop. Successive conventional fixed f stops for cameras such as a movie camera of the type here involved would comprise f1.9, wide open; f2.8; f4; f5.6; f8; f11; and f16, maximum restriction. Each of these f stops designates an actual change in the passage of light amounting to one-half of the light passed by the next larger aperture. For example, one-half of the light passed through a diaphragm aperture of f1.9 will pass through an aperture f2.8 and one-half of the light passed by an f2.8 aperture will pass through an aperture f4.0. This means, in a practical way, that the large aperture portion 25a, 26a must reduce into a light passing aperture one-half as great for the next succeeding f stop 2.8. For convenience, the centers of the apertures formed by the overlapping blades are indicated in the drawings, FIGURE 3, it being apparent that the blades provide infinite adjustment in which the indicated stops are merely noted for conventional reference.

The overlapping of the two blades at the junction between the large portions 25a, 26a and the wedge-shaped portions 25b, 26b provides an extremely irregularly shaped diaphragm opening. It has been found through exhaustive tests that unless an extremely abrupt change, approximating a right angle corner, is provided between the wedge-shaped portions 25b, 26b and their respective enlarged portions, an excessive amount of light is passed through the aperture between the f2.8 and f4.0 positions. It is desirable, however, in order to eliminate sharp corners and prevent any possibility of an upstanding burr on such a corner from causing the extremely light weight parts to bind or stick and to prevent any possible reflection from such a sharp corner, that the portion intermediate between the wedge-shaped portions 25b, 26b and the enlarged portions 25a, 26a comprise a smooth curve. This may be accomplished in accordance with the present invention by extending the curve portion 25d, 26d inwardly of the wedge-shaped portion 25b, 26b in a manner constricting the wedge portion immediately adjacent the large portion of the aperture and then immediately relieving this constriction back beyond the width of the wedge-shaped portions 25b, 26b as is clearly indicated in the drawings. It has been found through the above-mentioned tests that this irregular necked-in configuration provides a truly linear relationship for successive f stops where a tear drop employing a wedge-shaped portion smoothly filleted into the large portion will not provide satisfactory results. This result is achieved in spite of the fact that from first glance such an irregular configuration would seem deleterious rather than beneficial. The transition from the enlargement 25c to the outer part of the wedge portion also comprises a smooth curve.

It will be apparent from a consideration of the above specification and the attached drawings that we have provided a substantially improved and greatly simplified automatic exposure control camera incorporating an accurate control of the amount of light passed through the lens throughout the range of diaphragm adjustment. Those skilled in the art will at once appreciate that variations and modifications may be made in the structure shown by way of illustration in the present specification without departing from the scope of the novel concepts thereof and it is, accordingly, our intention that the scope of the present invention be limited solely by that of the hereinafter appended claims.

We claim as our invention:

1. In a photographic camera, an exposure aperture controlling diaphragm comprising a pair of diaphragm blades each of which has a generally arcuate aperture therein intersecting the axis of said photographic camera aperture, each of said blade apertures comprising an enlarged generally circular terminal area portion having an opening approximating the opening of said camera aperture and said blades being directly timed to position said terminal portions in overlapping relation to each other when one of said portions is over said aperture, each of said blade apertures having a generally tapering wedge-shaped arcuate portion of substantially smaller radial dimension than the said terminal portion extending from said terminal portion, the point of juncture between said wedge portion and said terminal portion comprising a necked-in constriction having a width narrower than the widest part of said wedge and said constriction being followed by a portion of expansion, the transition from said enlarged terminal portion to said wedge portion comprising a smooth curve.

2. In a photographic camera, an exposure aperture, a diaphragm comprising a moving diaphragm member which has a generally arcuate opening therein intersecting the axis of said photographic camera aperture, said opening comprising an enlarged terminal area portion having an opening at least as large as the opening of said camera aperture and having a generally tapering wedge-shaped arcuate portion of substantially smaller radial dimension than the said terminal portion extending from said terminal portion, the point of juncture between said wedge portion and said terminal portion comprising a necked-in constriction having a width narrower than the widest part of said wedge and said constriction being followed by a portion of expansion, and a second diaphragm member having an opening over said aperture, said last named opening having a necked-in constriction oriented transversely of the restriction of said moving diaphragm member when the restriction of the latter is in front of said aperture.

3. In a photographic camera, an exposure aperture, a diaphragm comprising a diaphragm blade which has a generally arcuate opening therein intersecting the axis of said photographic camera aperture, said blade opening comprising an enlarged terminal area portion having an opening at least as large as the opening of said camera aperture and having a generally tapering wedge-shaped arcuate portion of substantially smaller radial dimension than the said terminal portion extending from said terminal portion, the point of juncture between said wedge portion and said terminal portion comprising a necked-in constriction having a width narrower than the widest part of said wedge and said constriction being followed by a portion of expansion, the transition from said portion of expansion to said wedge portion being curved, and means co-operating with said blade and said aperture when the necked-in constriction of said blade is positioned over the aperture providing a necked-in constriction over said aperture oriented relative to the necked-in constriction of said blade at an angle of approximately 90°.

4. In a photographic camera, the combination of means forming an exposure aperture, a statically balanced diaphragm blade member mounted for rotation on an axis normal to the plane of and spaced outwardly from said aperture and having a portion thereof overlapping in front of said aperture, said diaphragm blade member being provided with an arcuate opening therethrough tapering in width and extending angularly of said diaphragm member and arranged to cross centrally of said exposure aperture to form a diaphragm opening variable with angular adjustment of said diaphragm blade, said blade opening comprising an enlarged generally circular terminal area portion having an opening at least as large as the opening of said camera aperture, and having a generally tapering wedge-shaped arcuate portion of substantially smaller radial dimension than the said terminal portion extending from said terminal portion, the point of juncture between said wedge portion and said terminal portion comprising a necked-in constriction having a width narrower than the widest part of said wedge and said constriction being followed in the direction toward the wedge portion remote from the terminal portion by a portion of expansion, the transition from said portion of expansion to the outer part of said wedge portion comprising a smooth curve, and means co-operating with said blade and said aperture when the necked-in constriction of said blade is positioned over the aperture providing a necked-in constriction over said aperture oriented relative to the necked-in constriction of said blade at an angle of approximately 90°.

5. In a photographic camera, an exposure aperture, a diaphragm comprising a diaphragm blade which has a generally arcuate opening therein intersecting the axis of said photographic camera aperture, said blade opening comprising an enlarged terminal area portion having an opening at least as large as the opening of said camera aperture and having a generally tapering wedge-shaped arcuate portion of substantially smaller radial dimension than the said terminal portion extending from said terminal portion, the point of juncture between said wedge portion and said terminal portion comprising a necked-in constriction having a width narrower than the widest part of said wedge and said constriction being followed by a portion of expansion, and means co-operating with said blade and said aperture when the necked-in constriction of said blade is positioned over the aperture providing a necked-in constriction over said aperture oriented relative to the necked-in constriction of said blade at an angle of approximately 90°.

References Cited in the file of this patent

UNITED STATES PATENTS 2,841,064     Bagby et al.     July 1, 1958

FOREIGN PATENTS 941,875     Germany     1956